United States Patent [19]

Herchenroeder

[11] 4,155,751

[45] * May 22, 1979

[54] WELDABLE ALLOY

[75] Inventor: Robert B. H. Herchenroeder, Kokomo, Ind.

[73] Assignee: Cabot Corporation, Kokomo, Ind.

[*] Notice: The portion of the term of this patent subsequent to Jun. 20, 1995, has been disclaimed.

[21] Appl. No.: 839,262

[22] Filed: Oct. 4, 1977

Related U.S. Application Data

[60] Division of Ser. No. 710,577, Aug. 2, 1976, Pat. No. 4,095,976, which is a continuation-in-part of Ser. No. 644,843, Dec. 29, 1975, abandoned, which is a continuation-in-part of Ser. No. 99,738, Dec. 21, 1970, abandoned.

[51] Int. Cl.² .............................................. C22C 19/05
[52] U.S. Cl. .................................... 75/122; 75/134 F; 75/171; 148/32; 148/32.5

[58] Field of Search ............ 75/171, 170, 122, 134 F; 148/32, 32.5

[56] References Cited

U.S. PATENT DOCUMENTS

| | | | |
|---|---|---|---|
| 2,104,836 | 1/1938 | Hessenbruch | 75/171 |
| 3,304,176 | 2/1967 | Wlodek | 75/171 |
| 3,383,206 | 5/1968 | Wlodek | 75/171 |

*Primary Examiner*—R. Dean
*Attorney, Agent, or Firm*—Joseph J. Phillips; Jack Schuman

[57] ABSTRACT

An alloy containing 20–23% chromium, 17–20% iron, up to 2.5% cobalt, 7–10% molybdenum, up to 1% tungsten, up to 0.15% carbon, 0.2–1% silicon, up to 1% manganese and the balance nickel is greatly stabilized with respect to weld crack resistance by the addition of lanthanum in effective but small carefully controlled amounts to 0.08% in the presence of silicon as an essential minor ingredient.

6 Claims, No Drawings

WELDABLE ALLOY

This application is a division of my co-pending application Ser. No. 710,577, filed Aug. 2, 1976, U.S. Pat. No. 4,095,976 which in turn was a continuation-in-part of my co-pending application Ser. No. 644,843, filed Dec. 29, 1975, abandoned which was in turn a continuation-in-part of application Ser. No. 99,738, filed Dec. 21, 1970, abandoned.

This invention relates to alloys, and more particularly to a solid solution type alloy of the Ni-Cr-Fe-Mo class which is economically attractive, and versatile by virtue of a combination of oxidation resistance and resistance to development of cracks in the heat affected zones produced during welding. The alloys provided are, therefore, particularly suited for use in structural parts designed for exposure to high-temperature oxidizing atmospheres, such as those commonly encountered in gas turbine engines.

Manufacturers are insisting that costs be reduced. Anything which contributes to the ease of manufacturing reduces cost; therefore, the improved weldability of an alloy manifested in fewer heat affected zone cracks reduces cost.

Products which last longer because they resist deterioration by oxidation resistance and attack by the environment reduce costs because replacement costs per unit time are less. The alloy of the invention satisfies this need.

Products which resist cracking because of thermal or mechanical fatigue are cost effective because they require fewer repairs and last longer. Alloys with improved high temperature ductility and a reduced number of surface defects caused by oxidation have greater resistance to fatigue damage. Alloys of this invention meet these criteria.

Commercial usage of the alloy of the invention is anticipated in those areas in which MULTIMET®, RA 333, and HASTELLOY® alloy X are now used. The new alloy should extend the range of applicability by permitting the alloy to be used in more severely oxidizing conditions than prior art alloys.
MULTIMET® and HASTELLOY® are registered trademarks of Cabot Corporation Other possible applications are automotive thermal reactors, reformer tubing and furnace hardware.

U.S. Pat. No. 3,304,176 to Wlodek shows that the addition of minor amounts of lanthanum is generally more beneficial in solid solution type nickel base alloys than in "precipitation strengthened" types. However, said patent does not teach the close control on the amount of lanthanum which is necessary for optimum weldability nor the essentiality of silicon and the optimum range of same to be used with lanthanum in this connection.

U.S. Pat. No. 3,383,206 also to Wlodek and a continuation-in-part of U.S. Pat. No. 3,304,176 speaks of an alloy consisting essentially of, by weight 20–23 Cr, 8–10 Mo, 17–20 Fe, up to 0.15 C, 0–2 W, 0.05 to less than 0.3 La, 0.5–6 of the spinel forming elements selected from the group Co and Mn, the Co when selected being in the range of 1–3% and the Mn when selected being in the range of 0.5–3% with the balance nickel and incidental impurities.

In U.S. Pat. No. 3,383,206 Wlodek taught that (1) manganese and cobalt in controlled amounts only up to 3 weight % each improved the oxidation resistance of the base alloy of 3,304,176 which contained 0.05 to 0.3 w/o La, (2) either cobalt or manganese in an amount greater than 3 w/o caused hot shortness in the alloy (Column 4, lines 72-75 and column 5, line 1); (3) tungsten and molybdenum are distinct and separate elements and not substitutional as evidenced by the separate and distinct ranges of 0-2 W and 8-10 Mo rather than an inclusive range of 8-12 W+Mo, (4) the preferred range of La was 0.1-0.3 w/o and (5) an alloy containing 0.17 w/o La particularly represented the alloy of his invention.

Wlodek did not teach any criticality of any alloying element with respect to weldability and specifically he did not teach any criticality of lanthanum content with respect to silicon content. Further, there is no evidence to suggest that he even suspected a criticality of La vs. weldability; he did not recognize that a problem existed.

Three heats of material of the same nominal compositions and within the Wlodek patent range with the exception of lanthanum content were subjected to weld tests. Two types of tests were used. The first consisted of welding a circular piece of the alloy to be tested to a heavy (about 1-inch thick) backup plate which had a hole in the center of it which was slightly smaller than the test piece. A circular fusion weld bead about 2 inches in diameter was made with controlled welding parameters. If a piece thus tested shows no evidence of cracking; the entire assembly is often aged to cause precipitation of second phases that tend to decrease ductility, impart additional stresses, and cause cracking. If the sheet being tested does not crack, it is deemed to have good restraint weldability. The second type of test—by far a less stringent test because of the lower stresses involved—consisted of simply fusion welding a circle in a sheet of material clamped—not welded—to a backup plate.

Alloy H, containing no La, was tested according to the first procedure but without the aging. This material cracked in the weld. Alloy I containing 0.06 w/o La was also treated according to the first procedure including the post-weld aging. No cracks were found either before or after aging with the exception of small crater cracks which are almost impossible to eliminate at the finish point of the weld bead without using filler rod.

Alloy J, containing 0.17 w/o La and a preferred composition of Wlodek was tested according to the less demanding second procedure but with similar welding parameters. Gross cracking occurred.

Thus, it is shown that about 0.06 w/o La is beneficial to the weldability of this base material while as much as 0.17 w/o La, the preferred amount in Wlodek, is detrimental.

While an analogous criticality of lanthanum apparently exists in Wlodek's and related systems with regard to weldability as exists in the alloys of copending Ser. No. 644,843 invention, all evidence indicates that Wlodek was not aware of this criticality. In fact, alloy J of this experiment is from the same heat of material as Example 1 (Table II of Wlodek U.S. Pat. No. 3,383,206) of Wlodek, it is well within the preferred composition range (Column 2, lines 3-5) of Wlodek, but had the worst weldability of those tested in the experiment. Alloy I, which had the best crack resistance contained near the optimum amount of lanthanum for the alloys of the invention of Ser. No. 644,843, but was barely within the broad range of lanthanum content of Wlodek's system. Had Wlodek recognized that a small but effective amount to less than 0.08 w/o La was an optimum range for La, he certainly would have bracketed this critical range in his claims and would have appropriately noted it in his specification.

One aspect which was noted, is that base compositions containing lanthanum contents above 0.1 w/o had marginal forgeability, whereas those heats with lower than 0.1 w/o La forged well. Three of the seven ingots of alloys of J, MM and NN failed completely during forging whereas 6 of 6 ingots of alloys I, KK and LL forged without difficulty and with excellent recovery.

EXPERIMENTAL ALLOYS
CHEMICAL COMPOSITIONS, WEIGHT PERCENT

|  | Alloy | Al | Cr | W | Fe | C | Si | Co | Ni | Mn | Mo | La |
|---|---|---|---|---|---|---|---|---|---|---|---|---|
| X5-4791 | H | — | 21.64 | 0.63 | 17.91 | 0.07 | 0.75 | 1.78 | Bal. | 0.65 | 9.0 | — |
| 66-527 | *I | 0.19 | 22.44 | 0.21 | 18.60 | 0.04 | 0.75 | 1.86 | Bal. | 0.90 | 8.96 | 0.06 |
|  | J | — | 21.78 | 0.64 | 18.50 | 0.09 | 0.79 | 1.91 | Bal. | 1.0 | 9.16 | 0.17 |
| 66509 | *KK | — | 22.53 | 0.39 | 19.15 | 0.12 | 0.95 | 2.40 | Bal. | 0.85 | 7.62 | 0.03 |
| 66510 | *LL | — | 22.40 | 0.44 | 19.24 | 0.07 | 0.79 | 2.54 | Bal. | 0.89 | 7.75 | 0.03 |
|  | MM | 0.18 | 22.60 | 0.43 | 18.70 | 0.09 | 1.03 | 1.90 | Bal. | 1.08 | 8.57 | 0.13 av. |
| 66-523 | NN | 0.21 | 22.46 | 0.42 | 18.90 | 0.07 | 0.91 | 1.90 | Bal. | 0.94 | 8.57 | 0.13 av. |
| X6-4568 | OO | — | 21.68 | 0.51 | 18.31 | 0.06 | 0.74 | 1.75 | Bal. | 0.53 | 9.15 | — |

*Alloys of Invention

From this it is apparent that the two systems are different in the basic properties of hot workability and weldability and therefore different in kind rather then degree.

One of the primary objects of the invention is to provide an alloy that is weldable, oxidation resistant, stable, "but not unduly expensive."

Average electron vacancies (or Phacomp or simply $\bar{N}_v$) calculations are an accepted method of predicting the formation of the detrimental formation of topologically close packed phases (TCP).

Three articles (W. J. Boesch and J. S. Slaney, "Metals Progress" July 1964, Vol. 86, No. 1, pp. 109-111; L. R. Woodyatt et al., TMS, April 1966, Vol. 236, pp. 519-527; and H. J. Murphy et al., International Symposium on Structural Stability in Superalloys, Sepetember 4-6, 1968, Vol. 1, pp. 47-61) review the concepts of $\bar{N}_v$ calculations adequately.

Generally, the lower the average electron vacancy concentration, the lower the likelihood of TCP formation. Increased amounts of elements such as Co, Fe, W, Mo and Si in lieu of Ni would increase the average vacancy concentration. Conversely a decrease in the amounts of elements like Mo would decrease the average vacancy concentration.

In order to obtain the optimum in oxidation resistance a minimum of about 0.2 w/o and preferably between 0.3–1 w/o Si is required in the alloy of this system. Because of its large $N_v$ coefficient of 6.66 and the difference in atomic weights of Si and Mo, only 0.5 w/o Si has the same effect on the average electron vacancy concentration as 2.5 w/o Mo; Silicon has about 5 times the effect on $N_v$ as Mo.

Tungsten and molybdenum are not substitutional in the alloys of the invention even though many investigators have interchanged them successfully in some instances. Wlodek, as noted, recognized this fact when he established separate and distinct ranges for these elements for his alloys. With respect to electron vacancy concentration and aged ductility, Mo has twice the effect of raising electron vacancy concentration as does W.

The objects and advantages of the present invention are achieved by simultaneously controlling the silicon content of the solution-strengthened alloy between about 0.2 and about 1%, and preferably between about 0.3 and about 1% by weight, and the lanthanum content at a very small but effective level up to about 0.08%, and preferably between about 0.02 and about 0.07% by weight. The major ingredients of my modified solution-strengthened nickel base alloy are (with amounts given in weight percent): about 20–23% Cr; about 17–20% iron; up to 2.5% Co; about 7–10% molybdenum; up to 1% W; effective to 0.15% carbon, about 0.2–1% silicon, the balance nickel and incidental impurities. To improve strength in castings the preferred carbon range is 0.1–0.6.

Other common alloying ingredients such as zirconium, titanium, tantalum, columbium or hafnium may be present in small amounts in the present invention, they will be restricted to less than about 1 or 2% by weight of the alloy. Traces or fractional percentages of other elements such as boron and nitrogen are sometimes added for extraneous reasons as is known in the metallurgical arts, but again, these play no significant role in the present invention. For example, calcium, magnesium or other deoxidants are sometimes added during the preparation of a melt, but usually only traces or fractional percentages are retained as a residual part of the finished alloy.

Aluminum in addition to being an excellent deoxidant is also believed to be beneficial to oxidation resistance in small amounts up to about 0.5%.

Any of the standard methods conventionally used in manufacturing superalloys can be used in preparing the alloys of this invention, such as air induction melting, vacuum melting, etc. Other than the normal care required in analyzing constituents, intermediate combinations and finished melts to insure attainment of the desired composition, the most critical step in the process is the addition of the lanthanum. In spite of the small amounts of lanthanum required in the present invention, the desired benefits therefrom can be obtained even if it is added in crude mixtures with other rare earth metals. Concentrated forms of lanthanum are preferably used in the present invention so that the lanthanum exceeds the total of all the other rare earths. One of the most convenient forms for use in the present invention is that of a prealloy or master alloy of a refined lanthanum source with nickel, cobalt and/or silicon.

In any case, regardless of the form in which the lanthanum is added, it is normally convenient and efficient to add same during the late stages of preparation thereof.

EXAMPLE I

To illustrate that the superb oxidation resistance demonstrated by Wlodek is not impaired by utilizing lower lanthanum contents to achieve superior hot forgeability and weldability an oxidation test was performed.

Six samples each of alloys I, NN and OO were exposed fifty hours at 2200° F. Results show the oxidation resistance of the low lanthanum alloy I to be essentially equivalent to its high lanthanum counterpart NN and vastly superior to the base alloy OO without La.

| Alloy | Oxidation Test 50 hours at 2200° F. weight change mg/cm$^2$ | |
|---|---|---|
| I | +1.9 ave | 1 sigma 0.08 |
| NN | +1.4 ave | 1 sigma 0.09 |
| OO | −56.9 | 1 sigma 13.9 |

Although specific embodiments of the present invention have been described in connection with the above illustrative Example, it should be understood that various other modifications can be made by those having ordinary skills in the metallurgical arts without departing from the spirit of the invention taught herein. Therefore, the scope of this invention should be measured solely by the appended claims.

I claim:

1. A weldable and oxidation resistant alloy consisting essentially by weight of:
   about 20—23% chomium
   about 17—20% iron
   up to 1% tungsten
   about 7—10% molybdenum
   about 0.05—0.6% carbon
   about 0.2—1% silicon
   up to 2.5% cobalt
   up to about 1% manganese
   an effective amount of lanthanum to provide weldability and high temperature oxidation resistance to about 0.03% and in a sufficiently concentrated form that the total amount of all other rare earth metals is less than the amount of lanthanum, and the balance nickel, and incidental impurities.

2. A weldable and oxidation resistant wrought alloy as claimed in claim 1 containing 0.1 to 0.15% carbon.

3. A weldable and oxidation resistant alloy with ranges in conformance with commercial melting capability consisting essentially in weight percent of about:
   chromium—22
   iron—18.5
   tungsten—0.5
   molybdenum—9
   carbon—0.08
   silicon—0.5
   cobalt—1.5
   manganese—0.8
   lanthanum in effective amounts to provide weldability and high temperature oxidation resistance up to 0.03% and provided the total amount of rare earth elements other than lanthanum is minimized and maintained below the lanthanum content and the balance nickel and incidental impurities.

4. An oxidation resistant welded article made from an alloy consisting essentially of:
   about 20—23% chromium
   about 17—20% iron
   up to 1% tungsten
   about 7—10% molybdenum
   about 0.05—0.6% carbon
   about 0.2—1% silicon
   up to 2.5% cobalt
   up to about 1% manganese
   an effective amount of lanthanum to provide weldability and high temperature oxidation resistance to about 0.03% and in a sufficiently concentrated form that the total amount of all other rare earth metals is less than the amount of lanthanum and the balance nickel and incidental impurities.

5. An oxidation resistant welded wrought article as claimed in claim 4 containing 0.1 to 0.15% carbon.

6. An oxidation resistant welded article made from an alloy with ranges in conformance with commercial melting capability consisting essentially of:
   chromium—22
   iron—18.5
   tungsten—0.5
   molybdenum—9
   carbon—0.08
   silicon—0.5
   cobalt—1.5
   manganese—0.8
   lanthanum in effective amounts to provide weldability and high temperature oxidation resistance up to 0.03% and provided the total amount of rare earth elements other than lanthanum is minimized and maintained below the lanthanum content and the balance nickel and incidental impurities.

* * * * *